3,385,807
CELLULAR URETHANES AND PROCESS FOR PREPARING SAME WHEREIN A COMBINATION OF STANNOUS AND LEAD SALTS ARE EMPLOYED
Richard J. Herdlein, Buffalo, and Andrew Shultz, Williamsville, N.Y., assignors to Allied Chemical Corporation, New York, N.Y., a corporation of New York
No Drawing. Continuation-in-part of application Ser. No. 414,903, Nov. 30, 1964. This application Nov. 5, 1965, Ser. No. 506,577
12 Claims. (Cl. 260—2.5)

This application is a continuation-in-part of our co-pending application S.N. 414,903, filed Nov. 30, 1964, and now abandoned. This invention relates to cellular urethanes. More particularly it relates to flexible cellular urethanes which possess excellent and uniform physical properties.

Cellular urethanes are prepared by reacting, in the presence of a blowing agent, polyisocyanates with active hydrogen containing substances such as polyesters, including polyester amides, and hydroxyl containing polyethers, including polyether diols and triols. Usually the reaction is carried out in the presence of catalysts such as organo-tin compounds and tertiary amines and emulsifiers such as silicone oils. These substances are incorporated in the reaction mass to control reaction rate, cell size, porosity and the like. The urethanes are generally cast as slabstock on a moving belt in forms, which are open at the top to permit free rise of the expanding polymerizing mass. As the urethane polymer rises, the material gels and the cell structure forms. Heat resulting from the several reactions taking place, is dissipated at different rates throughout the polymer mass with the result that the center portion of the cellular product is often somewhat hotter than the top or sides. In extreme cases, "burnout" can occur, i.e., the temperature can attain so high a degree as to cause decomposition of the polymer. More often this problem of heat transfer causes variation in the strength and structure of the polymer slab. Such variations are undesirable since sections, taken both transversely and horizontally, show variations in physical properties to such a degree that all sections cannot be used for the same products and must be graded and sorted, an expensive and undesirable process. Certain of the sections, which fail to meet specifications, may be ground or discarded. In the manufacture of flexible cellular urethanes, which are used to a large extent for comfort cushioning, the load bearing characteristic is an important specification. Relatively minor variation, i.e., a difference of more than about five pounds in load bearing as measured by indentation load deflection test (ASTM D–1564–59T) is undesirable. Such variations in the load bearing characteristic of sections of flexible cellular urethanes from top to bottom of the slabstock are not unusual, and are especially noted in slabstock made under conditions of high humidity, i.e., above about 80% relative humidity, and high ambient temperature, i.e., above about 80° F. Inasmuch as such severe conditions prevail in many areas, where the flexible cellular urethanes are manufactured, e.g., the southeastern United States, it can readily be seen that the manufacture of flexible cellular urethanes leaves something to be desired.

It is, therefore, a principal object of the present invention to provide improved cellular urethanes characterized by a minimum variance in load bearing property throughout the cellular structure.

Another object is to devise a process for the production of cellular urethanes having substantially uniform load bearing character through the cellular structure.

Other objects and advantages will be apparent from the following description of our invention.

I have made the surprising discovery that flexible cellular urethane foams having an ILD (Indentation Load Deflection) at 25% which does not vary by more than 5 pounds at any point can be obtained by a one-shot process comprising admixing the following materials:

(a) a diisocyanate;
(b) a polyether polyol;
(c) water;
(d) an organic tin compound catalyst in an amount of about 1200 to about 3800 parts by weight per million (p.p.m.) parts by weight of polyether polyol; and
(e) a load conforming agent consisting essentially of trace amounts of a lead salt of an organic acid, said lead salt being present in an amount providing about 10 to about 175 parts by weight of lead per million parts by weight of polyether polyol.

It is most important in order to obtain the desired result of the present invention to keep the lead content within the prescribed range and to simultaneously maintain the organic tin catalyst within its prescribed range. It is not understood why the tin catalyst must be limited within the conventional ranges, but it has been observed in numerous tests that a material departure from prescribed proportions of tin and lead compounds results in impairment of the properties of the urethane foam.

The resultant cellular urethane structures are characterized by having substantially uniform load bearing characteristics, i.e., the indentation load deflection at 25% deflection of a section taken at any point of the cellular structure does not vary by more than five pounds from that of a section taken from another part of the said structure.

Such uniformity of the load bearing characteristic of the cellular structure enables the production of urethanes with a minimum of waste, and thus improves the economics of the manufacture of this type of material.

The polyether polyols used in this process include those of the flexible type. Such compounds are known in this art and are believed to have essentially the following general formula:

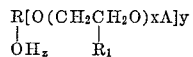

wherein R is the residue of a polyol as exemplified below; $R_1$ is hydrogen or methyl; A is hydrogen, $-CH_2CH_2OH$, or $-CH_2CH_2CH_2OH$, $x$ is an integer from 5 to 50, $y$ is an integer 2 or 3, and $z$ is an integer 0 or 1. Such polyether polyols can be obtained in a known manner by condensation of alkylene oxide such as ethylene oxide, 1,2-propylene oxide, 1,3-propylene oxide or mixtures thereof with polyhydric alcohols, such as ethylene glycol, propylene glycol, dipropylene glycol, tetramethylene glycol, glycerin, trimethylol propane or mixtures thereof, in the presence of suitable catalysts or initiators such as trialkylamines, e.g., trimethylamine, or inorganic bases, e.g., potassium hydroxide, or a halide, e.g., boron trifluoride. Those products resulting from the condensation of 1,2-propylene oxide and mixtures thereof with ethylene oxide are preferred. The molecular weights of the polyether polyols preferably range from about 400 to about 6000.

Polyether polyols prepared from ethylene oxide and a glycol or triol may be used but such products are soluble in water to a significant extent and the polymers derived therefrom are characterized by poor hydrolytic stability.

In an especially preferred embodiment, we employ a more reactive polyol, an ethylene oxide capped or "tipped" polyether polyol such as an ethylene oxide tipped glycerine initiated polyoxypropylene triol having a hydroxyl number of 46 and a primary hydroxyl group content of about 35%. We have found that flexible cellular urethanes utilizing these more reactive polyols having primary hydroxyl groups require a significantly smaller amount of lead. These reactive polyols, referred to hereafter as "tipped" polyether polyols, and their preparation are well-known in the art as illustrated by U.S. Patent 3,016,404.

A general discussion of polyether polyols and their preparation can be found in Saunders et al., Polyurethanes, Chemistry and Technology, pt. I, Chemistry, High Polymers, vol. XVI, Interscience Publishers, 1962, pp. 32–44 and pt. I, p. 5.

Any of a wide variety of diisocyanates, or mixtures thereof, can be used in this novel process. Liquid diisocyanates are preferred. As examples of this component, the following are mentioned: m-phenylene diisocyanate, 2,4-tolylene diisocyanate, 2,6-tolylene diisocyanate, naphthalene-1,5-diisocyanate, naphthalene-1,8-diisocyanate, 4,4-methylene-bis-(phenylisocyanate), 4,4'-methylene-bis (tolylisocyanate), 4,4'-methylene-bis(cyclohexylisocyanate), i,6-hexamethylene diisocyanate.

A general discussion of isocyanates and their preparation can be found in Saunders et al., cited supra, pp. 17–32.

Tolylene diisocyanates such as those disclosed in French Patent No. 1,375,975 are contemplated.

The amount of diisocyanate used is generally sufficient to react with the hydroxyl groups of the polyol and with the water used to generate carbon dioxide for blowing the mixture. Preferably an amount of polyisocyanate is used which is sufficient to provide a ratio of NCO to active hydrogens within the range of 0.9 to 1.5:1. Especially preferred is the use of an NCO:H ratio of 1.0 to 1.2:1.

In accordance with what is now conventional practice for producing flexible cellular urethane structures, the polyisocyanate-polyol mixture may be reacted in the presence of various adjuvants such as auxiliary blowing agents, activators and/or catalysts, dispersing agents or emulsifiers and the like.

The improved cellular urethanes of our invention are primarily water-blown structures. Water by reaction with the isocyanate component generates carbon dioxide gas for the blowing and additionally forms urea groups which are believed to contribute to chain stiffeners and stability under humid aging conditions. Urea groups, on the other hand, induce hardness in the cellular structure. Auxiliary blowing agents, particularly non-reactive low boiling organic liquids, may be used to increase softness and decrease density in such products. Such liquids as methylene chloride and particularly fluorinated hydrocarbons as well as mixtures thereof can be used.

The amount of water supplied may be sufficient to generate all the $CO_2$ necessary or may be employed in lesser amount and supplemented by an auxiliary blowing agent, as noted. The amount of water can vary from about 1 part to 6 parts per 100 parts by weight of the polyol, preferably, about 2 to about 4 parts per 100 parts of polyol.

Such agents are characterized by being liquids or gases at normal temperatures and pressures, poor solvents for the organic polymer and by boiling at temperatures at or below that generated by the urethane formation reaction. The last characteristic is useful as it provides a means of reducing heat build up in the polymer forming mass. Increasing the concentration of these auxiliary agents decreases the maximum temperature within the cellular structure and increases the time to reach this maximum temperature. As typical examples of these fluorocarbons the following are mentioned: monofluorotrichloromethane; dichlorodifluoromethane; monochlorotrifluoromethane; trichlorotrifluoroethane; dichlorotetrafluoroethane; difluorotetrachloroethane; 1,1-difluoroethane; 1,1,1-dichlorofluoroethane.

Mixtures of these and equivalent auxiliary blowing agents are contemplated also.

Conventional organo-tin salt catalysts can be used. The preferred organo-tin salt catalysts are exemplified by stannous octoate and stannous oleate. The organo-tin salt catalyst must be present in amounts from about 1200 to about 3800 p.p.m. based on the weight of the polyol. In general, for each p.p.m. of lead employed, about 10 p.p.m. less of the tin catalyst should be employed. Thus when employing the tipped polyether polyols, from about 1900 to about 2900 p.p.m., preferably about 2200 to about 2750 p.p.m. are employed. When employing the more conventional polyether polyols, from about 1250 to about 2500 p.p.m., preferably about 1800 to about 2300 p.p.m. are employed.

Auxiliary catalyst such as the tertiary amine catalysts are preferably used in addition to the organo-tin compound. Examples of tertiary amine catalysts are: triethylamine, N-methylmorpholine, triethylenediamine, N,N,N', N', tetramethyl-1,3-butanediamine, and soya lecithin.

Trace amounts of a load conforming agent are necessary to this process. The load conforming agent of this invention consists essentially of a lead salt of an organic acid. These lead salts are preferably soluble in the polyether polyol. The organic acid portion of the lead salt can be a saturated or unsaturated, straight or branched chain, aliphatic or cycloaliphatic carboxylic acid. The number of carbons can range from 5 to 30 or more. Aryl carboxylic acids are also satisfactory. The compounds can be substituted or unsubstituted, but are preferably hydrocarbons with one carboxyl group although more than one carboxyl group can be present. Typical compounds are lead-2-ethylhexoate, lead oleate, lead stearate, lead ricinoleate, lead palmitate, lead naphthenate and lead benzoate. The preferred salt is lead-2-ethylhexoate because of its superior activitiy and ready availability.

The amount of lead salt must be present in an amount providing about 10 to about 175 p.p.m. by weight of lead based on the polyether polyol. When employing the "tipped" polyether polyols, lower amounts of lead may be employed in the range of about 10 to about 110 p.p.m., preferably 25 to 80 p.p.m. and when employing the more conventional polyether polyols, amounts from about 70 to about 175 p.p.m., preferably 70 to 120 p.p.m. are employed. It is preferred to use a higher amount of lead salt with a lower amount of tin salt or a lower amount of lead salt with a higher amount of tin salt within the prescribed ranges.

Dispersing or emulsifying agents conventionally used in this art include polyethylene phenol ethers, blends of polyalcohol carboxylic acid esters, oil soluble sulfonates, siloxane-oxyalkylene block co-polymers and the like. The preferred adjuvants of this group in the present instance are the silicone-oxyalkylene block co-polymers, having the general formula:

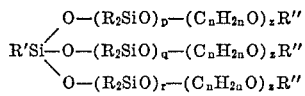

wherein R, R', and R'' are $C_{1-18}$ alkyl radicals; $p$, $q$ and $r$ are integers from 2 to 15, and $—(C_nH_{2n}O)_x$ is a polyoxyalkylene block which is preferably a polyoxyethylene containing from 10 to 50 of each polyoxyalkylene unit. Products of this type are disclosed in U.S.P. 2,834,748 and Belgium Patents 582,362–3. Such siloxane-oxy-alkylene block copolymers are available commercially, one such product being offered in which above general formula $R=CH_3$, $R'=C_2H_5$, $R''=C_4H_9$, $p=q=r=7$, and the block, $—(C_nH_{2n}O)_x$ is a polyoxyethylene-polyoxypropylene block containing about 50 units of each polyoxyalkylene moiety.

The formulation, curing and application treatments of cellular urethane structures of this general class to which the novel compositions of this invention belong are well known to those skilled in the art to which these novel compositions pertain and accordingly no extended discussion of these well-known and conventional collateral aspects of the inventions is deemed necessary.

As indicated above, the problem of variance in load bearing character of cellular urethanes may be due, in part, to differences in heat transfer and rate of polymer growth which occurs during the polymer forming reaction. As the size of the polymer product increases these variations will be intensified. The problem is of minor consequence in laboratory prepared cellular structures wherein the polymer structure rarely exceeds 12 inches in height. Present day commercial practice wherein cellular structures are produced on endless belts generally reach the size of 36 or more inches in width, 14 or more inches in height and have a length of 5 to 10 or more feet. In such commercially produced blocks or "buns" the temperature of the outer and mid portions may vary 100° F. or more due to the low thermal conductivity of the urethane polymer. Such large temperature variations, it is believed, are accompanied by variations in polymer growth and curing which doubtlessly result, to a major extent, in the variation in physical properties, notably load bearing. Thus as the dimensions of the "bun" increase the value of the present invention increases also.

The more detailed practice of the present invention will be illustrated by the following examples in which parts and percentages are by weight and temperatures are given in degrees centigrade.

EXAMPLE 1

A solution of 0.031 part of lead-2-ethyl hexoate in 100 parts of a glycerin initiated polyoxypropylene triol having an average molecular weight of 3000 was prepared. The solution contained 130 p.p.m. of lead. To this solution the following were added:

3.9 parts of water
0.1 part triethylenediamine
1.3 part siloxane-oxyalkylene block copolymer, and
0.20 part of stannous octoate.

The resulting mixture was thoroughly mixed and then combined with 48.7 parts of a mixture of about 80% 2,4-tolylene diisocyanate and about 20% 2,6-tolylene diisocyanate in a conventional slabstock machine operating at the rate of about 250 lbs./min. The buns, which rose to a height of about 26 inches were permitted to stand at ambient temperature for about 16 hours (over night). Thereafter sections taken at 4 in. intervals from the top to the bottom of the slab or bum were submitted to the Indentation Load Deflection (ILD) Test at 25% deflection. The results obtained are given in Table 1 below.

EXAMPLE 2

The procedure of Example 1 above was repeated with the exception that the stannous octoate was increased to 0.24 part instead of 0.20 part. The ILD values, determined in an analogous fashion, are also set out in Table 1 below.

EXAMPLE 3

The procedure of Example 1 was again repeated and the lead octoate was omitted. Additional tin salt was added to compensate for the lead octoate. The ILD values are set out in Table 1 below.

TABLE 1.—INDENTATION LOAD DEFLECTION AT 25% DEFLECTION

| Section | Ex. 1 (lbs.) | Ex. 2 (lbs.) | Ex. 3 (lbs.) |
|---|---|---|---|
| Top 4 inches | 45.0 | 45.6 | 34.5 |
| Next 4 inches | 47.0 | 48.0 | 40.5 |
| Do | 49.6 | 49.5 | 41.8 |
| Bottom 4 inches | 49.4 | 52.5 | 43.3 |
| Variance | 4.4 | 6.9 | 8.8 |

These data indicate that the bun prepared in Examples 2 and 3 would not be satisfactory due to the difference in load bearing character from top to bottom. The top 4 inch section would have to be removed and regraded to a lower classification, or shredded to be used as "filler" or scrapped. However, the bun prepared in Example 1 is satisfactory from top to bottom and only the "skin" needs to be removed.

The following flexible cellular foams were prepared employing the procedure of Example 1, differing therefrom in (1) the polyols used; (2) the amounts of lead; (3) the amounts of tin catalyst.

Foam A

To a polyol blend composed of:

(1) 60 parts of an ethylene oxide tipped glycerine initiated polyoxypropylene triol having an OH No. ("hydroxyl number") of 46 and a primary hydroxyl group content of about 35%,
(2) 20 parts of a glycerine initiated polyoxypropylene triol having an OH No. of 56 containing essentially all secondary hydroxyl groups, and
(3) 20 parts of a polyoxypropylene diol having an OH No. of 56.

Lead octoate was added in sufficient amount to provide 60 parts of lead per million parts of polyol. The resulting solution was reacted in a conventional slabstock foaming equipment with the following:

3.75 parts of water
0.13 part of triethylene diamine
1.35 parts siloxane-oxyalkylene block copolymer
0.33 part stannous octoate
4.0 parts methylene chloride
45.2 parts tolylene diisocyanates The resulting buns were permitted to stand at ambient temperature for about 16 hours (overnight). Sections of the resultant foam slab taken at approximate 4 in. intervals from top to bottom were submitted to the ILD test at 25% deflection. The results obtained did not vary more than 2.7 lbs.

Foam B

Foam B was prepared as Foam A except for the following:

(1) The polyol blend was composed of 80 parts of ethylene oxide tipped glycerine initiated polyoxypropylene triol having an OH No. of 46 and a primary hydroxyl content of 38% and 20 parts of a polyoxypropylene diol having an OH No. of 56.
(2) The polyol blend contained 20 p.p.m. of lead.
(3) 0.27 part of stannous octoate was used.

The resulting foam showed 0 variation in ILD at 25% deflection.

Foam C

Foam C was prepared as described for Foam B with the exception that the proportion of stannous octoate was increased to 0.33 part. The resultant foam showed a variation of 2 lbs. from top to bottom in ILD at 25% deflection.

Foams D, E and F

Foams D, E and F were prepared as described for Foam C with the following differences:

(1) The triol used was an ethylene oxide tipped glycerine initiated polyoxypropylene triol from a different batch having a primary hydroxy content of about 37.5%.
(2) The triol/diol blend in each of these three instances contained 25 p.p.m. of lead.
(3) The stannous octoate was varied from 0.24 part in Foam D, to 0.27 part in Foam E, to 0.33 part in Foam F.

Foam D showed a variance of 2.2 lbs.
Foam E showed a variance of 1.9 lbs.
Foam F showed a variance of 4.0 lbs.

It can thus be seen that an effective means for improving the uniformity with respect to load bearing character of cellular urethanes has been devised. By this means, the manufacture of such foams can be carried out without the

We claim:
1. A one-shot process for preparing flexible cellular urethane foams comprising admixing:
   (a) organic diisocyanate;
   (b) a polyether polyol;
   (c) water;
   (d) an organic-tin catalyst selected from the group consisting of stannous oleate and stannous octoate in an amount of about 1200 to about 3800 parts by weight per million parts by weight of polyether polyol; and
   (e) a load conforming agent consisting essentially of trace amounts of a lead salt of an organic carboxylic acid of 5 to 30 carbon atoms, said lead salt being present in an amount providing about 10 to about 175 parts by weight of lead per million parts by weight of polyether polyol with the proviso that when more than about 2300 parts by weight of said organic tin compound and less than about 70 parts by weight of said lead per million parts by weight of said polyether polyol is used, said polyether polyol is an ethylene oxide tipped polyether polyol.

2. The process of claim 1 wherein said polyether polyol is selected from the class represented by the general formula:

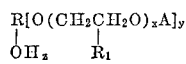

wherein
R is the residue of an alkylene polyol;
$R_1$ is hydrogen or methyl;
A is hydrogen, —$CH_2CH_2OH$ or —$CH_2CH_2CH_2OH$;
$x$ is an integer from 5 to 50;
$y$ is the integer 2 or 3; and
$z$ is the integer 0 or 1.

3. The process of claim 2 wherein said organic tin catalyst is present in an amount of about 1250 to about 2300 parts by weight per million parts by weight of polyether polyol and said lead salt is present in an amount providing about 70 to about 175 parts by weight of lead per million parts by weight of polyether polyol.

4. The process of claim 2 wherein said organic tin catalyst is present in an amount of about 1800 to about 2300 parts by weight per million parts by weight of polyether polyol and said lead salt is present in an amount providing about 70 to about 120 parts by weight of lead per million parts by weight of polyether polyol.

5. The process of claim 1 wherein said polyether polyol is an ethylene oxide tipped polyether polyol.

6. The process of claim 5 wherein said organic tin catalyst is present in an amount of about 1900 to about 2900 parts by weight per million parts by weight of polyether polyol and said lead salt is present in an amount providing about 10 to about 110 parts by weight of lead per million parts by weight of polyether polyol.

7. The process of claim 5 wherein said organic tin catalyst is present in an amount of about 2200 to about 2750 parts by weight per million parts by weight of polyether polyol and said lead salt is present in an amount providing about 25 to about 80 parts by weight of lead per million parts by weight of polyether polyol.

8. The product produced by the process of claim 1.

9. The process of claim 1 wherein said amount of said tin catalyst and said amount of said lead salt are used so that a lower amount of tin catalyst is employed with a higher amount of lead salt and a higher amount of tin catalyst is employed with a lower amount of lead salt.

10. The process of claim 1 wherein said polyether polyol is an ethylene oxide tipped glycerine initiated polyoxypropylene triol and wherein said organic tin catalyst is present in an amount of about 1900 to about 2900 parts by weight per million parts by weight of polyether polyol and said lead salt is present in an amount providing about 10 to about 110 parts by weight of lead.

11. A one-shot process for preparing flexible cellular urethane foams comprising admixing:
   (a) organic diisocyanate;
   (b) a polyether polyol;
   (c) water;
   (d) an organic tin catalyst selected from the group consisting of stannous oleate and stannous octoate in an amount of about 1200 to about 3800 parts by weight per million parts by weight of polyether polyol; and
   (e) a load conforming agent consisting essentially of trace amounts of a lead salt of an organic carboxylic acid selected from the group consisting of lead octoate, lead oleate, lead stearate, lead ricinoleate, lead palmitate, lead naphthenate and lead benzoate, said lead salt being present in an amount providing about 10 to about 175 parts by weight of lead per million parts by weight of polyether polyol with the proviso that when more than about 2300 parts by weight of said organic tin compound and less than about 70 parts by weight of said lead per million parts by weight of said polyether polyol is used, said polyether polyol is an ethylene oxide tipped polyether polyol.

12. The process of claim 11 wherein said tin catalyst is selected from the group consisting of stannous octoate and stannous oleate and wherein said lead salt is lead octoate.

References Cited

UNITED STATES PATENTS

| | | | |
|---|---|---|---|
| 3,267,047 | 8/1966 | Gmitter et al. | 260—2.5 |
| 3,039,976 | 6/1962 | Barnes | 260—2.5 |
| 3,127,312 | 3/1964 | Boyer | 260—2.5 |
| 3,179,627 | 4/1965 | Twitchett | 260—45.75 |
| 3,182,037 | 5/1965 | Nelson | 260—45.75 |
| 3,238,273 | 3/1966 | Hampson et al. | 260—2.5 |
| 3,245,923 | 4/1966 | Manzella et al. | 260—2.5 |

DONALD E. CZAJA, *Primary Examiner.*

MICHAEL B. FEIN, *Assistant Examiner.*